(12) United States Patent
McKenzie et al.

(10) Patent No.: US 8,910,816 B2
(45) Date of Patent: *Dec. 16, 2014

(54) REMOTELY ACTIVATED TANK HATCH SYSTEM

(75) Inventors: Kevin McKenzie, San Jose, CA (US); Sal Trejo, Gilroy, CA (US)

(73) Assignee: RMC Engineering Co., Inc., Gilroy, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/311,360

(22) Filed: Dec. 5, 2011

(65) Prior Publication Data

US 2012/0074144 A1  Mar. 29, 2012

Related U.S. Application Data

(63) Continuation of application No. 11/042,802, filed on Jan. 24, 2005, now Pat. No. 8,070,009.

(60) Provisional application No. 60/538,624, filed on Jan. 23, 2004.

(51) Int. Cl.
    *B65D 43/26* (2006.01)

(52) U.S. Cl.
    USPC ...... 220/263; 220/811; 220/252; 105/377.05; 105/377.06

(58) Field of Classification Search
    USPC ............ 220/263, 811, 252, 816; 105/377.01, 105/377.05, 377.06, 377.07, 377.08; 49/477.1
    See application file for complete search history.

(56) References Cited

U.S. PATENT DOCUMENTS

| | | | | |
|---|---|---|---|---|
| 4,854,076 A | * | 8/1989 | Sieben et al. | 49/280 |
| 5,150,543 A | * | 9/1992 | Wessiepe et al. | 49/477.1 |
| 5,937,581 A | * | 8/1999 | Matye et al. | 49/279 |
| 6,053,348 A | * | 4/2000 | Morch | 220/263 |
| 6,105,805 A | * | 8/2000 | Labelle et al. | 220/262 |
| 6,196,590 B1 | * | 3/2001 | Kim | 280/830 |
| 6,293,051 B1 | * | 9/2001 | Matye | 49/395 |
| 6,318,402 B1 | * | 11/2001 | Ladeira | 137/240 |
| 6,561,373 B1 | * | 5/2003 | Chapin | 220/262 |
| 7,055,440 B2 | * | 6/2006 | Sisk | 105/286 |
| 2002/0190068 A1 | * | 12/2002 | Sisk et al. | 220/263 |

* cited by examiner

*Primary Examiner* — Gregory J Strimbu
(74) *Attorney, Agent, or Firm* — GSS Law Group

(57) ABSTRACT

A remotely activated tank hatch system includes an upper frame and a lower frame joined by a hinge assembly. The lower frame is coupled to a collar of an opening of a tank and a hatch is coupled to the upper frame. The hinge assembly allows the upper frame to pivot the hatch between open and closed positions. The lower frame includes at least one catch to receive an edge of the hatch, when the hatch is closed. Spring members on the upper frame urge the hatch toward the upper frame so that the hatch may be swung away from the opening. Inflating a bladder positioned between the upper frame and hatch overcomes the spring pressure and urges the hatch into tight contact with the collar. The hatch system includes a remote control for inflating the bladder and for opening and closing the hatch.

5 Claims, 12 Drawing Sheets

REMOTELY ACTIVATED TANK HATCH SYSTEM

CROSS-REFERENCE TO RELATED APPLICATIONS

This application is a continuation of utility application Ser. No. 11/042,802 filed on Jan. 24, 2005, now U.S. Pat. No. 8,070,009, which is incorporated by reference in its entirety. Utility application Ser. No. 11/042,802 claimed the benefit of the priority date of provisional patent application No. 60/538,624, filed on Jan. 23, 2004, entitled: REMOTELY ACTIVATED TANK HATCH.

BACKGROUND OF THE INVENTION

1. Field of the Invention

The present invention relates to hatch systems for use on tanks, and more particularly, to remotely operated hatch systems for tanks and bulk carriers, such as those carried by trucks and trains.

2. Background Information

Commercial tanks, also commonly known as "tankers" and "bulk carriers", are widely used for transporting both liquid and dry goods. Tanks are configured with hatches to open and close an opening in the top of the tank, to access to the interior of the tank. Opening or closing the hatch often requires an operator to climb on top of the tank to manually release securing or locking mechanisms that keep the hatch closed. The operator then must lift or otherwise move the hatch cover to open the hatch. This operation can be hazardous to the operator, because a fall from the typical height of the top of the tank may cause injury, and because the contents of many such tanks often include vapors or gases which may be toxic or unpleasant. Inclement weather and moisture or ice on the top of the tank can increase the danger associated with climbing up on the tank and operating the hatch securing mechanism.

Since some types of goods transported by tank are transported under pressure, some tanks have opening closures that must withstand a pressure differential between internal and external pressures. For example, some tanks are used for the storage or transportation of granular or powder form dry bulk goods such as flour, salt, cement, lime, and cereal grains. These dry bulk goods are pneumatically transferred into the tank from a storage facility, via a pneumatic transfer system. Pneumatic transfer systems do not work properly unless the closure on the access port of the tank can maintain a pressure differential between the interior pressure of the tank and exterior pressure on the tank.

Automated hatch opening and closing systems have been devised in the prior art to allow remote operation of a hatch. Some of these systems can be retrofit on existing manually-operated hatches. Many preexisting automated hatch systems suffer from a number of disadvantages. One known disadvantage of these prior art hatch systems is that these systems are prone to leak when pressurized. Another known disadvantage to these systems is that significant modification is required to retrofit the preexisting tanks, which can be costly and time consuming to retrofit. Another known disadvantage of the prior art systems is that they may be complicated to install and somewhat expensive to purchase. A further known disadvantage of the prior art systems is that they may open the hatch vertically, thus potentially obstructing tank-filling equipment.

BRIEF SUMMARY OF THE INVENTION

The invention includes hatch systems for use on tanks and bulk carriers. One embodiment built in accord with the invention is a remotely operated hatch system for tanks and bulk carriers, such as those carried by trucks and trains.

The invented hatch system may comprise an upper frame and a lower frame that are joined by a hinge assembly. The lower frame is coupled to a collar of an opening of the tank and the hatch is coupled to the upper frame. The hinge assembly allows the upper frame to pivot the hatch between an open and closed position relative to the opening of the tank. The frame may also include at least one catch that is intended to receive an edge of the frame, when the hatch is closed.

A plurality of spring members on the upper frame are configured to urge the hatch upward and away from the tank opening. This provides a space between the opening of the tank and the hatch, so that the hatch may be swung away from the opening and thus not obstruct equipment used to fill the tank. An inflatable bladder may be positioned between the upper frame and the hatch. Inflating the bladder overcomes the spring pressure and urges the hatch into tight contact with the opening of the tank. The hatch system also includes a remote control means for inflating the bladder and for rotating the hatch between the open and closed positions.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

Figure 1:
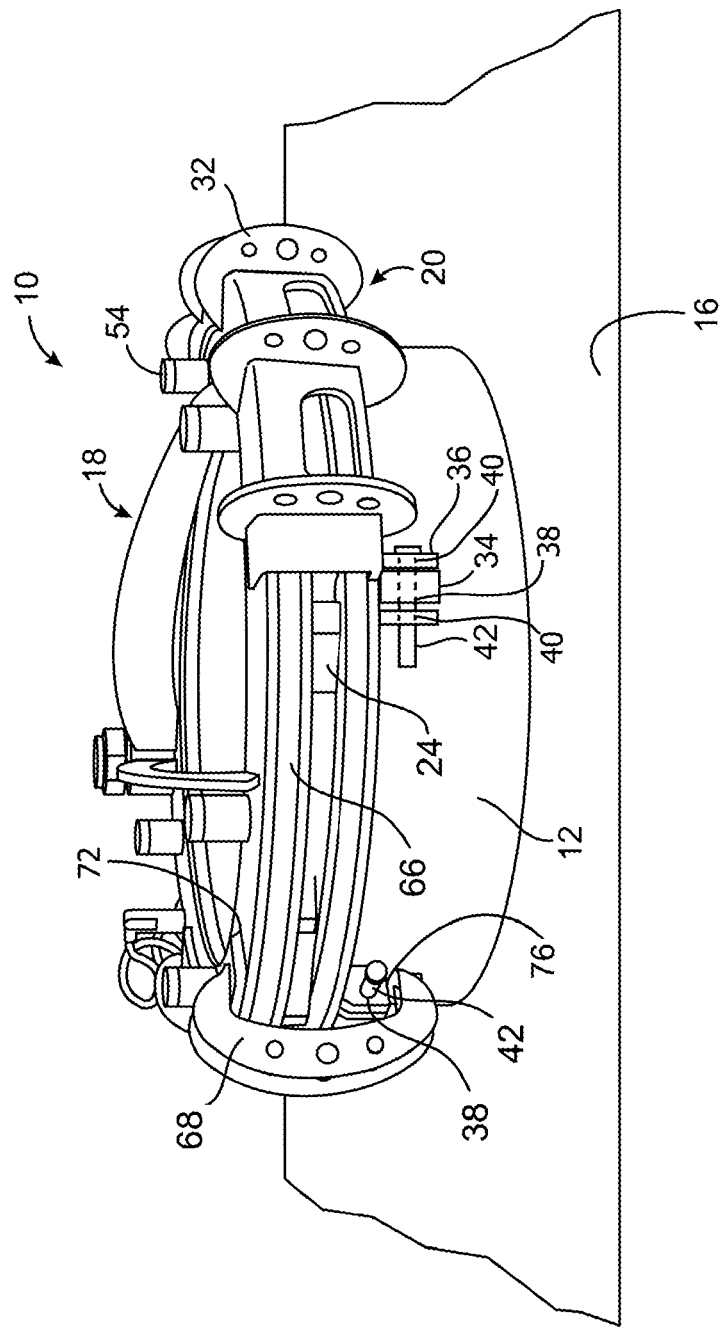
FIG. 1 is a side view of an embodiment of a remotely activated tank hatch system of the invention in closed position.
Figure 1A:
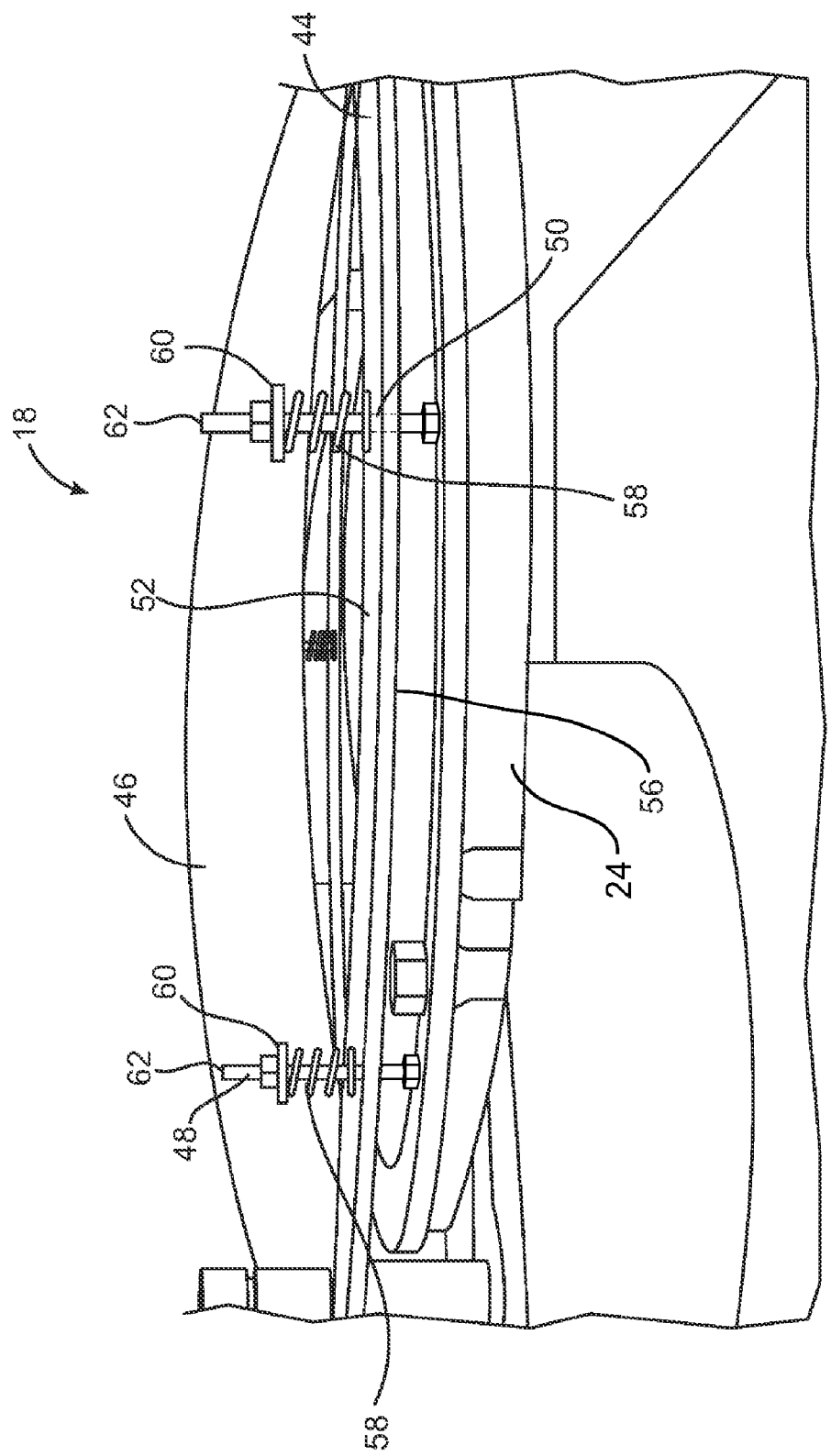
FIG. 1A is a side view of an embodiment of the invention where helical springs are visible.

The invention includes hatch systems for use on tanks One embodiment built in accord with the invention is a remotely operated hatch system for tanks and bulk carriers, such as those carried by trucks and trains.

Reference will now be made in detail to a presently preferred example embodiment of the invention as illustrated in the accompanying drawings. The invented hatch system shown in FIGS. 1-10 is provided as an example only, and although the examples given include many specifics, they are illustrative of only a few possible embodiments of the invention. Other embodiments and modifications will no doubt occur to those skilled in the art. The examples given should only be interpreted as illustrations of some of the preferred embodiments of the invention, and the full scope of the invention is comprehended to include alternate designs which may not be specifically disclosed herein.

Referring to the drawing Figures, there is shown generally at 10, an embodiment of a remotely activated tank hatch system of the present invention. The hatch system 10 is shown coupled to a collar 12 defining a tank opening 14 of a tank 16. It is to be understood that the tank 16 may comprise any commercial tank or bulk carrier, such as those carried by trucks and trains, for example.

Referring to FIG. 1 through FIG. 4, FIG. 8, and FIG. 10 of the drawings, the invented hatch system 10 may include an upper frame, shown generally at 18, and a lower frame, shown generally at 20, that are coupled by a hinge assembly 22. The lower frame 20 is coupled to the collar 12 and a hatch 24 is coupled to the upper frame 18, for enclosing the opening 14.

Referring to FIG. 3, FIG. 4, FIG. 8, and FIG. 10, the lower frame 20 may include an arcuate, U-channel member 26. The channel member 26 may have a lower edge 28 and an upper edge 30. A plurality of support members 32 may be spatially positioned along the channel member 26 for strengthening it. The lower edge 28 of the channel member 26 may be configured to extend about the periphery of the collar 12 and is coupled thereto.

Figure 8:
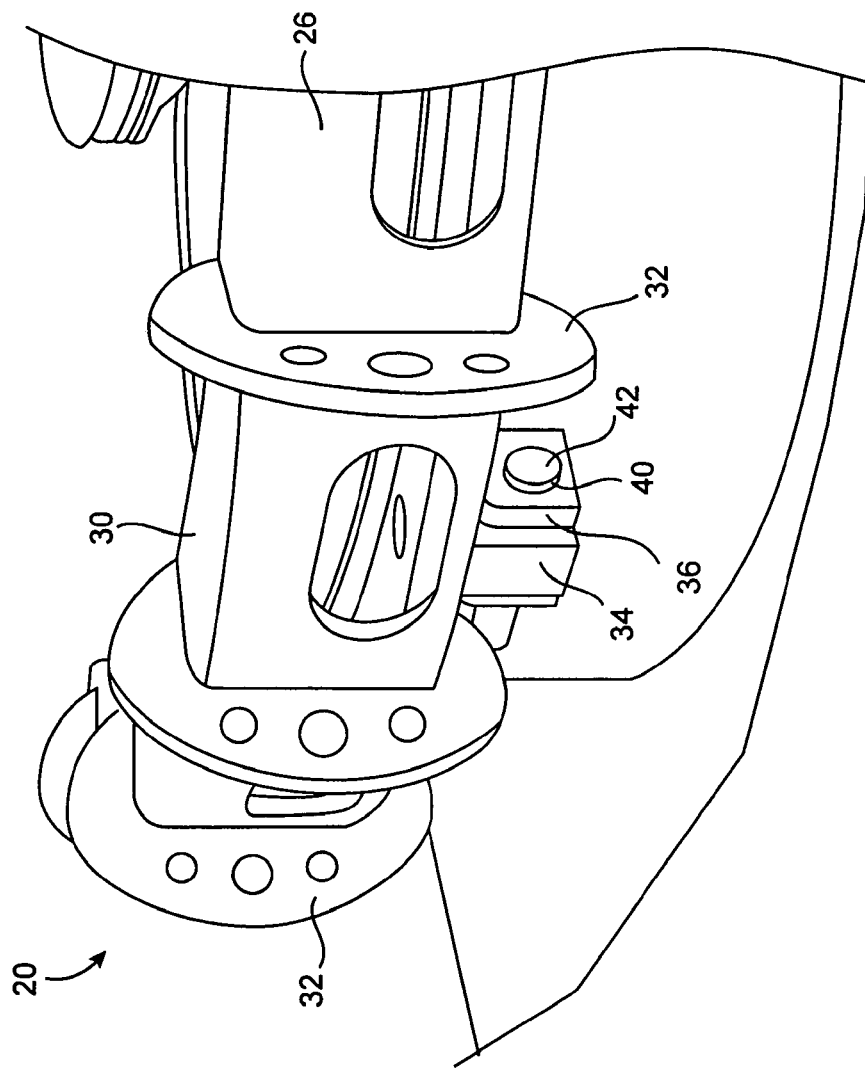
FIG. 8 is a detail view of an example of a lower frame of the invention.
Figure 9:
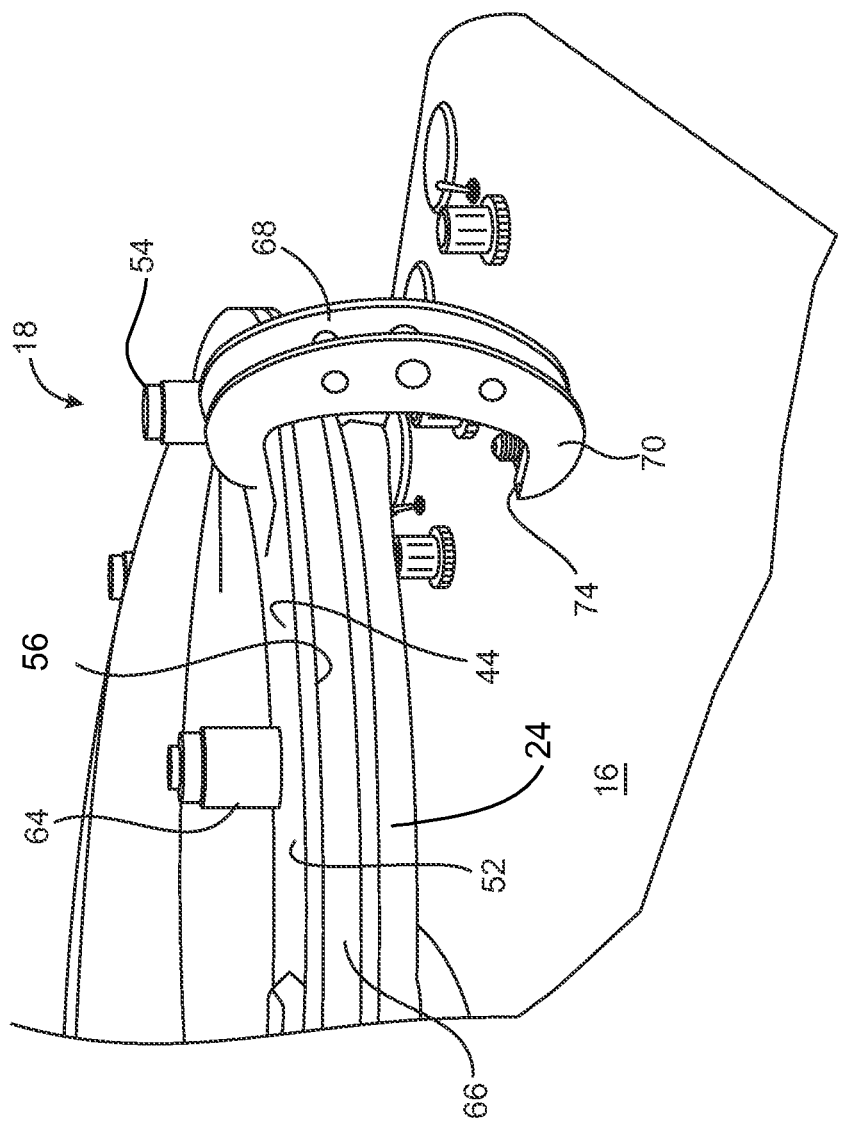
FIG. 9 is a side view of an embodiment of a catch of the invention
Figure 10:
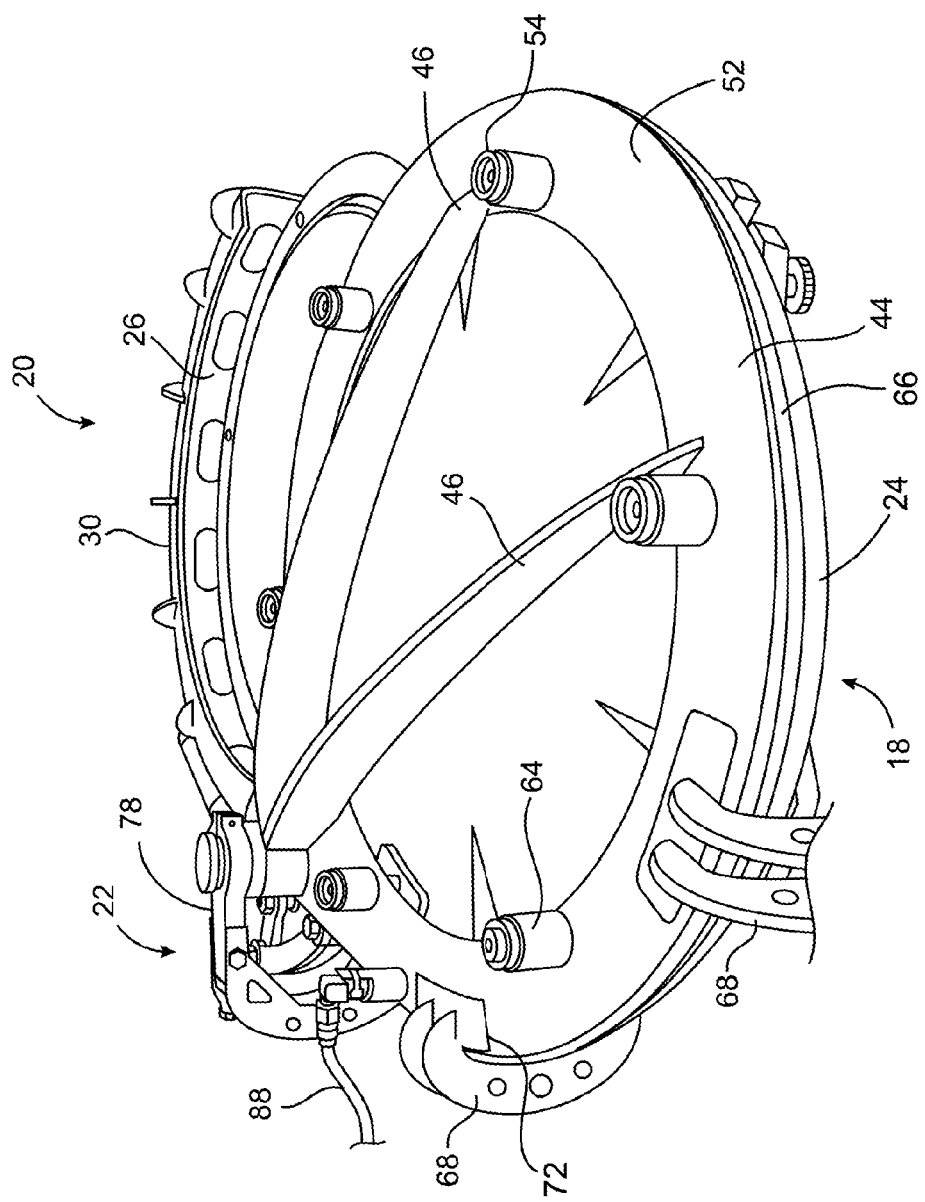
FIG. 10 is a top perspective view of an embodiment of an upper frame of the remotely activated tank hatch system of the present invention.

Referring particularly to FIG. 1 and FIG. 8, in the embodiment shown, tabs 34 are positioned about the periphery of the collar 12. The lower edge 28 of the channel member 26 may be configured with pairs of vertically extending flanges 36. Adjacent flanges 36 are positioned to extend over each side of a tab 34. A hole 38 (not clearly seen) may bored though each tab 34 and a corresponding opening 40 may also be formed in adjacent flanges 36. The tabs 34 are positioned between adjacent flanges 36 until the hole 38 in the tab 34 is aligned with the openings 40 in the flanges 36. A pin 42 may then be inserted through the opening 40 in one of the flanges 36, then through the hole 38 in the tab 34, and through the opening 40 in the remaining flange 36, to detachably couple the channel member 26 to the collar 12. The lower frame 20 may be fabricated using methods and materials well known in the art.

Referring to the drawing Figures, the upper frame 18 of the hatch system 10 is provided for retaining the hatch 24. The upper frame 18 may include a hatch support plate 44 that is coupled to the hatch 24 and affixed to the hinge assembly 22. The upper frame 18 may also include support members 46 that are affixed to both the support plate 44 and hinge assembly 22. The support plate 44 is preferably annular and may have a diameter similar to, or slightly greater than, the diameter of the hatch 24.

A plurality of pins 48 are provided to couple the hatch 24 to the support plate 44. The pins 48 may be affixed to the hatch 24 adjacent to its rim (not shown). The pins 48 extend approximately vertically upward from the hatch 24, through holes 50 in the support plate 44, and above a top side 52 of the support plate 44.

Compressible retaining members 54 are provided for lifting the hatch 24 toward a bottom side 56 of the support plate 44. In the embodiment shown, each compressible member 54 comprises a helical spring 58 fit over a pin 48 and a stop 60 that is affixed to the pin 48 adjacent to its end 62. The spring 58 is compressed between the stop 60 and the top side 52 of the support plate 44. The force exerted by compression of the springs 58 tends to lift the hatch 24 toward the bottom side 56 of the support plate 44. A cover 64 may be fit over each compressible retaining member 54 for protection from the elements.

Returning to FIG. 1, an inflatable bladder 66 is coupled to the bottom side 56 of the support plate 44 between the hatch 24 and the plate 44. The bladder 66 may be doughnut shaped and may be fabricated using suitable expandable and resilient materials, such as rubber for example. The bladder 66 may be inflated to overcome the spring force of the helical springs 58 and will tend to force the hatch 24 downwardly from the bottom side 56 of the support plate 44. This downward force is used to obtain a positive seal between the hatch 24 and the collar 12 of the tank 16.

Referring to FIG. 1 through FIG. 3, and FIG. 9 (best seen in FIG. 9), the invented hatch system 10 is provided with one or more catches 68 that inhibit the hatch 24 from moving relative to the opening 14 of the tank 16. The catch 68 may be any suitable configuration that inhibits the hatch 24 from moving relative to the opening 14 and that interlocks the upper and lower frames 18, 20 to allow pressure to be applied by the hatch 24 in order to assure a positive seal between the hatch 24 and collar 12. The catch 68 may also reduce stresses applied to the hinge assembly 22.

In the embodiment shown, the catch 68 may comprise one or more generally "C" shaped members that are configured to extend about a portion of the lower frame 20. For example, a catch 68 may comprise a pair of adjacent "C" shaped members 70 that are affixed to each other using know means, such as welding.

Each catch 68 may have an end 72 affixed to the support plate 44, then extend and is generally perpendicular to the plate 44 and down towards the lower frame 20. The catch 68 may also have a lip 74 that is configured to overlap a portion of the lower frame 20. The lip 74 of the catch 68 may be configured to overlap a lower edge 76 of the flanges 36.

When the inflatable bladder 66 is inflated, expansion of the bladder 66 tends to force the hatch 24 away from the hatch support plate 44 and toward the opening 14. The lip 74 of the catch 68 may contact the lower edge 76 of the flanges 36 and the channel member's upper edge 30 may contact the top side 52 of the support plate 44, thus interlocking the upper and lower frames 18, 20. This may prevent the hatch 24 from moving, thereby trapping the hatch 24 between the tank opening 14 and the upper frame 18. This allows pressure to be applied by the hatch 24 and to the tank opening 14 in order to assure a positive seal of the hatch 24 and collar 12.

Figure 5:
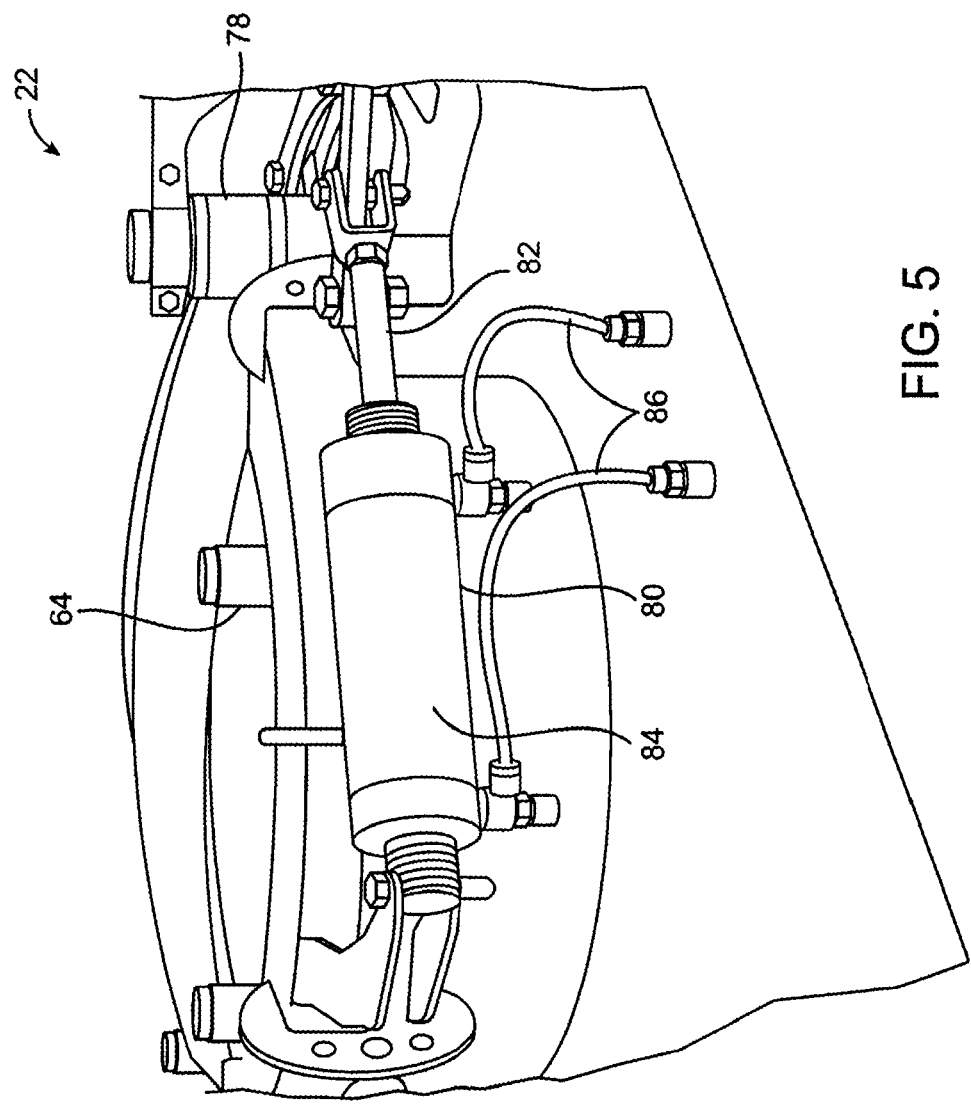
FIG. 5 is a perspective views of an embodiment of a hinge assembly of the invention.
Figure 6:
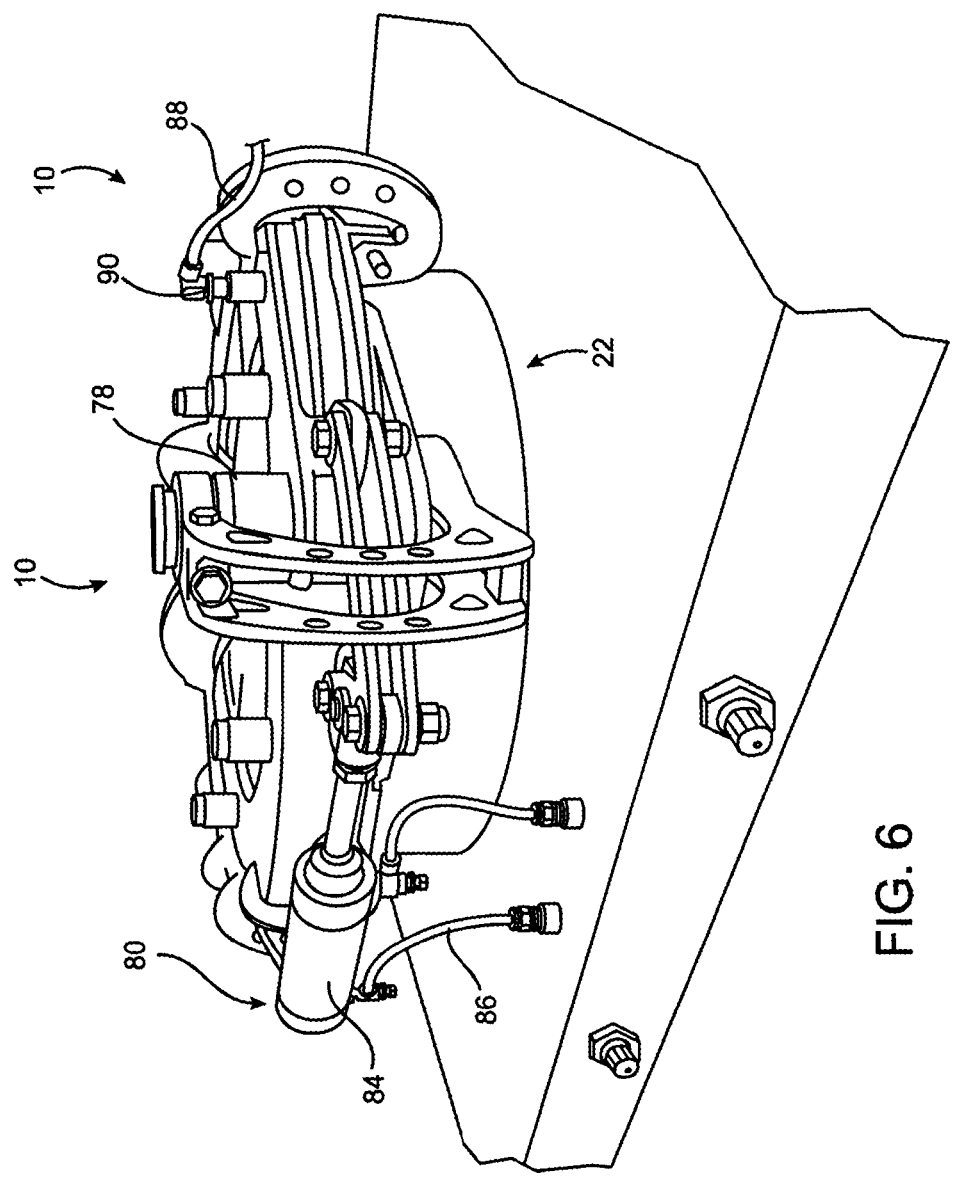
FIG. 6 is a perspective view of an embodiment of a hinge assembly of the invention.
Figure 7:
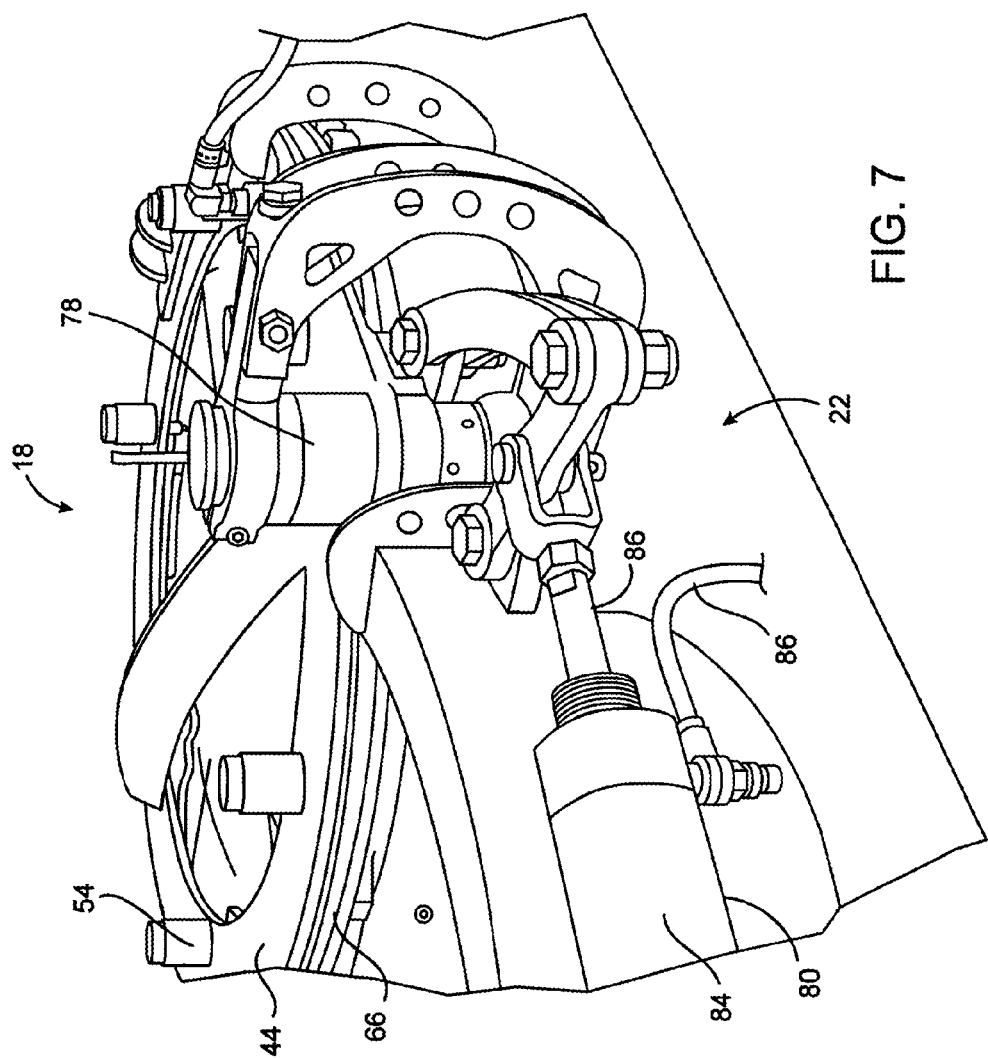
FIG. 7 is a perspective view of an embodiment of a pivot mechanism of the hinge assembly of the invention.

Referring to FIG. 5 through FIG. 7, the hinge assembly 22 may include a hinge 78 coupling the upper frame 18 to the lower frame 20, to allow the upper frame 18 to rotate the hatch 24 between an open and closed position relative to the tank's opening 14. The hinge assembly 22 may include a means for inflating and deflating the bladder 66, and a means for rotating the upper frame 18.

In the embodiment shown, the hinge assembly 22 includes a pneumatic piston 80 that is coupled to the upper frame 18 for opening and closing the hatch 24. A rod 82 of the piston 80 may be pivotably coupled to the hinge 78 and a body of the piston 80 may be affixed to the U-channel 26 of the lower frame 20. Air lines 86 may be coupled to the piston 80 for actuation thereof. The rod 82 of the piston 80 may be extended when the hatch 24 is in the closed position and may be refracted to open the hatch 24.

An air hose 88 may be coupled to the bladder 66, via the support plate 44, at one end 90 and may be coupled to an air source (not shown) at the other end. The air hose 88 provides a gas conduit for inflation and deflation of the bladder 66. The air lines 86 may be coupled to the piston 80 and the air hose 88 coupled to the support plate 44 using pneumatic fittings known in the art.

Figure 2:
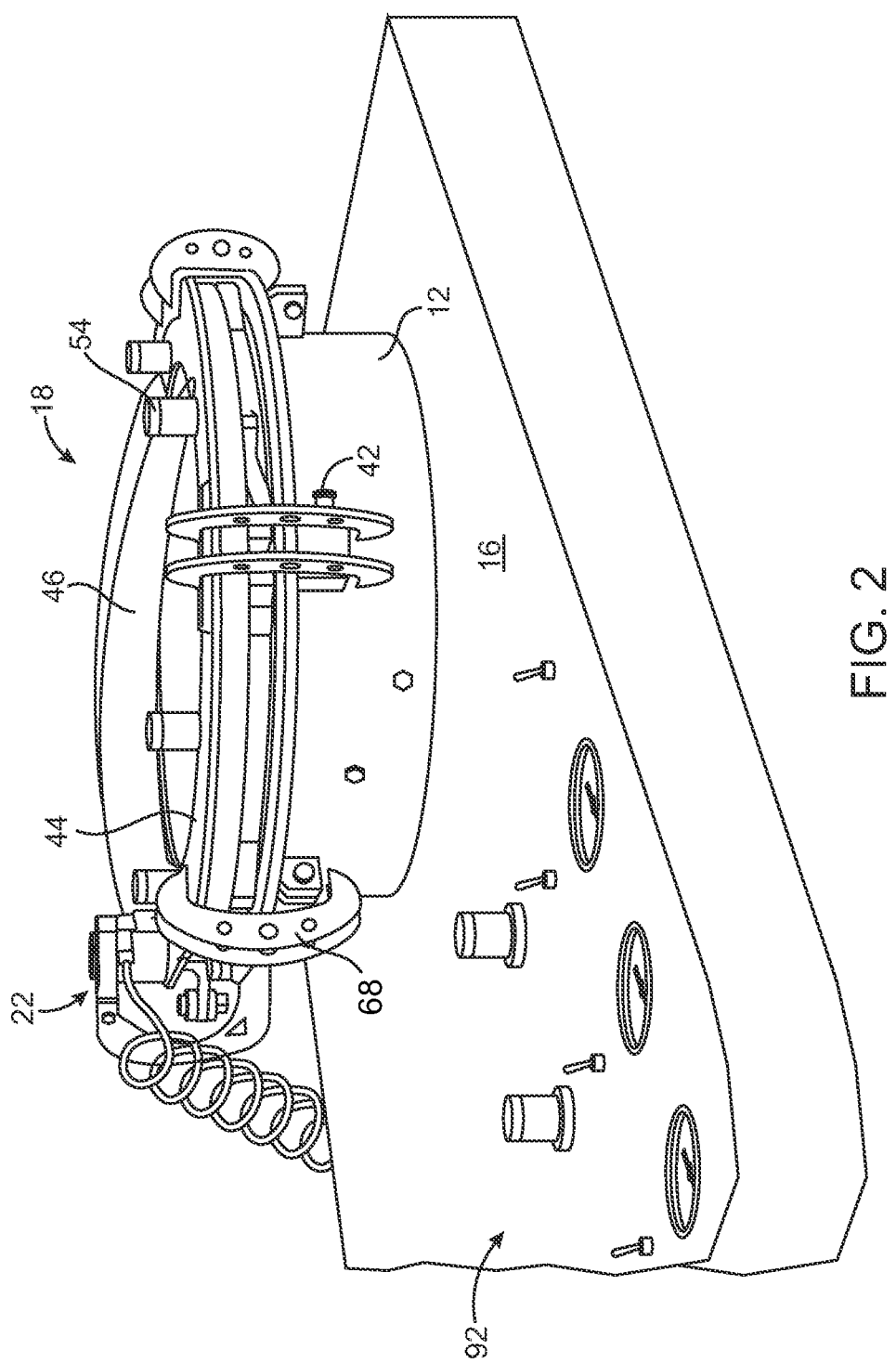
FIG. 2 is a side view of an embodiment of the invention in closed position and further showing a remote control panel of the invention.
Figure 3:
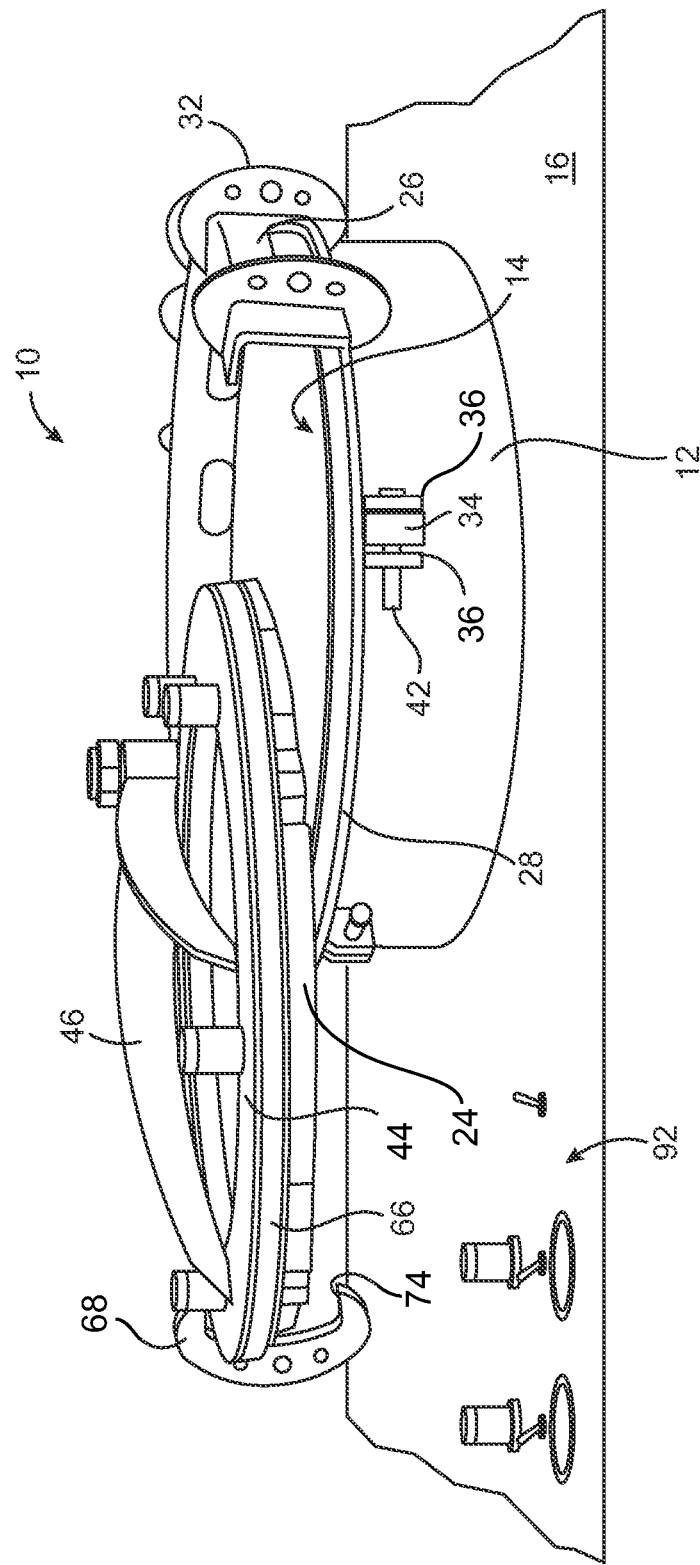
FIG. 3 is a side view of an embodiment of the invention in a partially open position.
Figure 4:
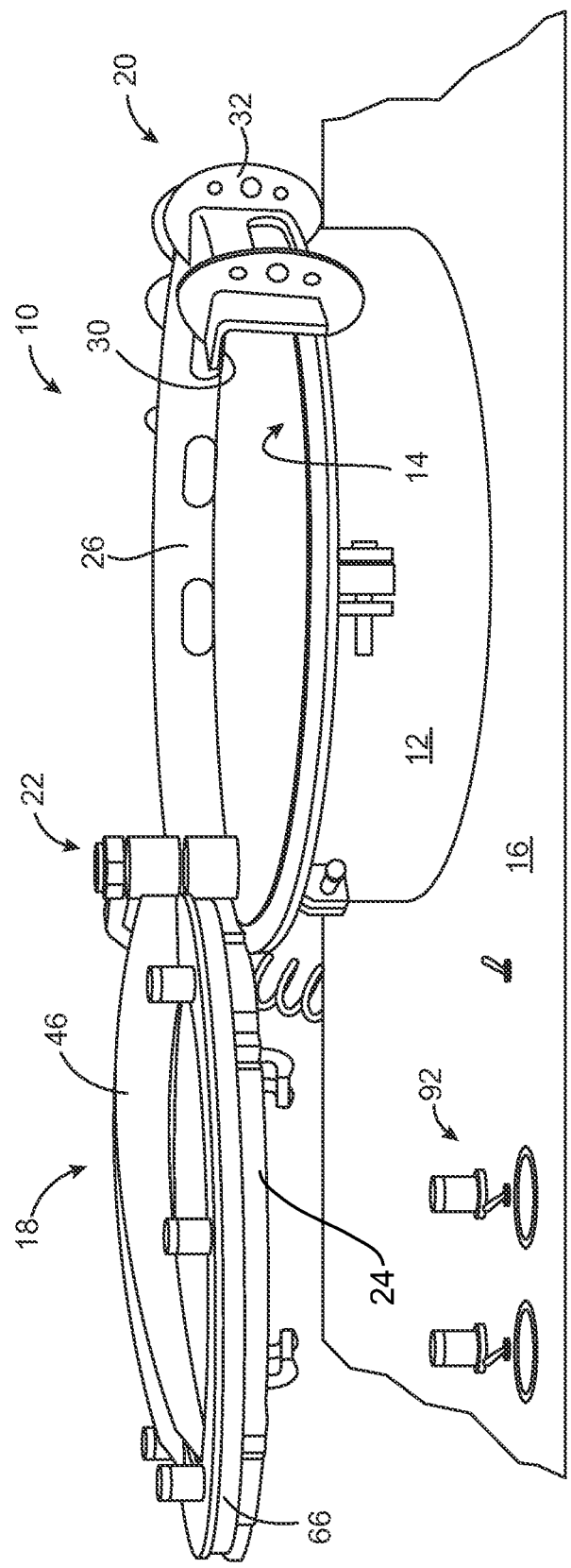
FIG. 4 is a side view of an embodiment of the invention in a fully open position and showing the panel of the invention.

Referring to the drawings and particularly to FIG. 2 and FIG. 4, an embodiment of a remote control panel 92 is shown for remotely actuating the invented tank hatch system 10. The control panel 92 is typically positioned at a distance from the hatch 24, such as near the ground where an operator could easily access the controls of the panel 92. The remote control panel 92 typically may include controls for actuating the piston 80 to open and close the hatch 24 and for inflating and deflating the bladder 66. The remote control panel 92 may be configured however desired, such that it provides the features of operation of the hatch system 10 discussed herein.

In use, an operator actuates the piston 80 for rotating the upper frame 18 to the open position. The tank 16 may then be filed without obstruction of the opening 14 by the hatch 24. Once the tank 16 is filled, the operator can then actuate the piston 80 to extend its rod 82 to rotate the upper frame 18 to the closed position. The bladder 66 may then be inflated to force the hatch 24 downward, to form a positive seal between the hatch 24 and opening 14.

When it is desired to open the hatch 24, the bladder 66 is first deflated. Once the bladder 66 is deflated, the compressible members 54 lift the hatch 24 away from the tank opening 14 at the top of the collar 12. The upper frame 18, and thus hatch 24, may then be rotated away from the opening 14.

Figure 11:
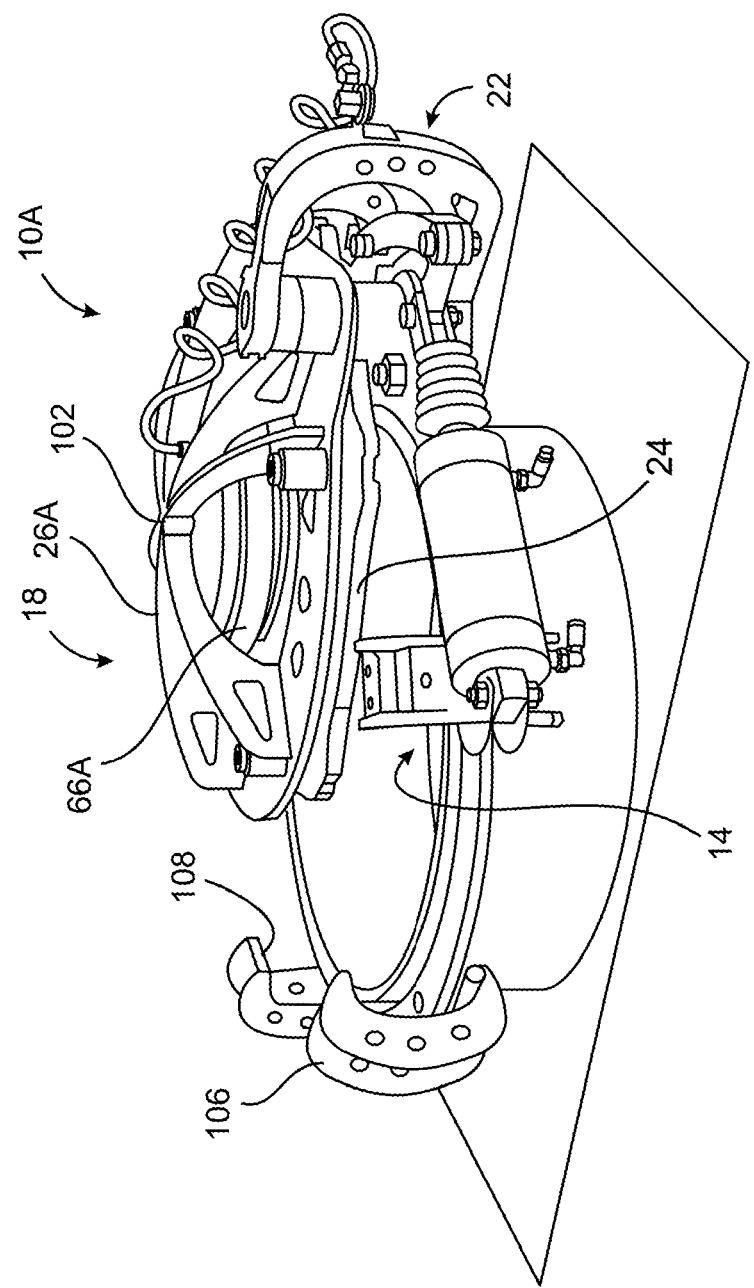
FIG. 11 is a perspective view of an alternative embodiment of an inflatable member of the invention.

FIG. 11 shows an alternative embodiment 10A of the invented hatch system. In the alternative embodiment 10A, the upper frame 18 includes a plurality of support members 26A that extend from the support plate 44 and meet at a center hub 102. A generally spherical bladder 66A is coupled to the hub 102 and to a center portion 104 of the hatch 24. Inflation and deflation of the spherical bladder 66A is controlled by the remote control 92 as previously discussed.

Further, in the alternative embodiment 10A, one or more catches 106 may be coupled to the lower frame 20. A lip 108 the catch 106 may overlap the support plate 44 to limit movement of the upper frame 18, to form a positive seal between the hatch 24 and opening 14, as discussed above.

The above described configuration is provided as an example. The important functionality includes the ability to lift the hatch from the tank opening, then later the ability to press the hatch downward tightly against the tank opening. Therefore, other apparatus configurations that provide this functionality may be useable in the invention.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A tank hatch system comprising:
    a lower frame adapted for coupling to a collar surrounding an opening of a tank, said lower frame comprising a retaining member;
    an upper frame comprising:
        a hatch support plate having an external bottom side;
        a hatch suspended from said hatch support plate beneath said bottom side of said hatch support plate;
        a selectively inflatable member in contact with said bottom side of said hatch support plate and said hatch adjacent a center of said hatch, said inflatable member disposed to urge said hatch away from said external bottom side of said hatch support plate and toward the collar;
        a catch for limiting movement of said upper frame relative to the collar; and
        at least one compressible member adapted for lifting said hatch toward said hatch support plate;
    a hinge assembly coupled to said upper frame for supporting pivoting movement of said upper frame relative to said lower frame;
    an actuator coupled to said upper frame for pivoting said upper frame between an open position and a closed position; and
    a remote control for controlling said actuator and for controlling inflation of said inflatable member,
    wherein said actuator is actuated to pivot said upper frame between said open position and said closed position, when said upper frame is in said closed position inflation of said inflatable member causes said hatch to form a positive seal with the collar, and said retaining member and said catch limit vertical movement of said upper frame relative to the collar.

2. The tank hatch system of claim 1 wherein said hatch moves away from said hatch support plate when said inflatable member inflates and said hatch moves toward said hatch support plate when said inflatable member deflates.

3. The tank hatch system of claim 1, wherein said at least one compressible member comprises a plurality of compressible retaining members coupling said hatch and said upper frame.

4. The tank hatch system of claim 3, wherein each of said plurality of compressible retaining members comprises a pin and a helical spring.

5. The tank hatch system of claim 1, wherein when said upper frame is in said open position said upper frame does not obstruct the opening of the tank.

* * * * *